Figure 1:
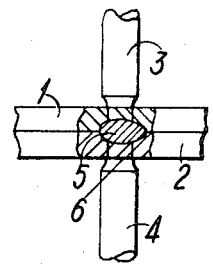

United States Patent [19]
Reed

[11] 3,721,796
[45] March 20, 1973

[54] WELDING ELECTRODES

[75] Inventor: Alan Reed, Sydney, Australia

[73] Assignee: Plessey Handel Und Investments A.G., Zug, Switzerland

[22] Filed: Dec. 2, 1971

[21] Appl. No.: 204,041

[30] Foreign Application Priority Data

Dec. 31, 1970  Great Britain.....................61,978/70

[52] U.S. Cl...................................219/119, 117/202
[51] Int. Cl. ............................................B23k 11/30
[58] Field of Search .......219/119; 117/202, 206, 207

[56] References Cited

UNITED STATES PATENTS

| 3,516,805 | 6/1970 | Nakamura et al. | 117/207 X |
| 3,184,835 | 5/1965 | Coxe et al. | 219/119 |
| 3,363,086 | 1/1968 | Ecklund et al. | 219/119 |

Primary Examiner—R. F. Staubly
Assistant Examiner—B. A. Reynolds
Attorney—Alex Friedman et al.

[57] ABSTRACT

A welding electrode for the electrical resistance welding of zinc and/or tin coated metal including a body member of copper or a copper-base alloy having an electroless nickel/phosphorus alloy coating on a welding face or faces thereof. The preferred electrode material is beryllium-copper and the thickness of the electroless nickel/phosphorus alloy coating is preferably in the range 0.0001 inches to 0.010 inches.

3 Claims, 2 Drawing Figures 3,721,796

WELDING ELECTRODES

The invention relates to welding electrodes for the electrical resistance welding of zinc and/or tin coated metal, and to methods of producing the electrodes.

The electrical resistance welding process involves gripping the pieces of metal that are to be welded, together by means of two electrodes situated one on each side of the metal pieces. The metal pieces are held tightly together by the electrodes under a controlled pressure. The electrodes which are usually of copper or a copper-base alloy, form part of an electrical circuit and the application of a voltage between the electrodes induces a current, hereinafter referred to as the weld current, to flow in the metal pieces between the electrodes. The heat generated by the metal pieces as a result of the electrical resistance they present to the weld current flow causes the metal to become molten locally. The pressure applied by the electrodes to the molten metal causes fusion and coalescence of the metal pieces at their points of contact.

In electrical resistance spot welding the weld is produced by electrical resistance to a weld current flow between two aligned rod-like electrodes. Electrical resistance seam welding is a similar process to spot welding except that rotary wheel-like electrodes are employed and a succession of overlapping spot welds are produced along a seam.

Quality control of the weld is achieved by regulating the magnitudes of the weld current, the electrode force, and the weld time i.e., the period of time during which the weld current and electrode force are applied. Apart from the thickness of the pieces being welded together, the major factor which determines the need for regulation of these variables during welding is the electrical contact resistance between the electrodes and the metal pieces.

The contact resistance between the electrodes and zinc and/or tin coated metal pieces is considerably lower than it is with uncoated metal pieces because of the relatively high electrical conductivity of the coating, its relative softness and its low melting point. Consequently, higher welding currents and longer welding times are required than for uncoated metal pieces of the same thickness. The higher welding currents and the resulting higher temperatures results in vaporization of the low melting point coating. The vaporized coating material alloys with the copper or copper-base electrodes at the weld interface to form brass in the case of a zinc coating, bronze in the case of a tin coating, and brass/bronze in the case of a zinc and tin coating. The alloy thus formed is softer than the original copper or copper-base electrode and, therefore, the erosion rate of the electrode and the deterioration of the electrode profile is greater than it would be for uncoated metal pieces. The deterioration in the electrode profile and the alloying effect results in a variation in the contact resistance and thereby a variation in the quality of the weld that is produced. Thus, the frequency of electrode profile redressing and subsequent electrode preconditioning is increased.

The invention provides a welding electrode for the electrical resistance welding of zinc and/or tin coated metal including a body member of copper or a copper-base alloy having an electroless nickel/phosphorus alloy coating on a welding face or faces thereof.

The invention also provides a method of producing a welding electrode for the electrical resistance welding of zinc and/or tin coated metal including the steps of providing a copper or copper-base body member of a desired form; profiling the body member to a desired welding face profile; and coating the profiled welding face with an electroless nickel/phosphorus alloy.

The preferred electrode material is beryllium-copper and the thickness of the electroless nickel/phosphorus alloy coating is preferably in the range 0.0001 inches to 0.010 inches.

Figure 2:
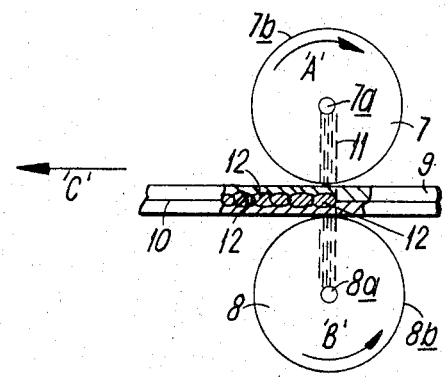

The foregoing and other features according to the invention will be better understood from the following description with reference to the accompanying drawings, in which:

FIG. 1 diagrammatically illustrates the electrical resistance spot welding process, and FIG. 2 diagrammatically illustrates the electrical resistance seam welding process.

As previously stated, electrical resistance welding causes fusion and coalescence of the pieces of metal being welded due to the heat generated as a result of the electrical resistance exhibited by the metal pieces to the weld current.

The electrical resistance spot welding process which is diagrammatically illustrated in FIG. 1 of the drawings, involves gripping two pieces of metal 1 and 2 together by means of two aligned rod-like electrodes 3 and 4, the welding faces of the electrodes, e.g., the face 6 of the electrode 4, are in contact with the metal pieces 1 and 2. The metal pieces 1 and 2 are held tightly together by the electrodes 3 and 4 under a controlled pressure. As previously stated, the electrodes 3 and 4 form part of an electrical circuit (not illustrated) and the combined effects of the weld current generated by the electrical circuit and the electrode force results in the formation of a weld 5 which joins the metal pieces 1 and 2 together.

The electrical resistance seam welding process which is diagrammatically illustrated in FIG. 2 of the drawings, is a similar process to the one outlined in the preceding paragraph for the spot welding process except that wheel-like electrodes 7 and 8 are employed. The electrodes 7 and 8 which are rotatable respectively about a central shaft 7a and 8a, grip two pieces of metal 9 and 10 together under a controlled pressure. The profile of the welding faces 7b and 8b of the electrodes 7 and 8 respectively, is radiused and determined by the diameter of the electrodes. The electrical circuit (not illustrated) which as previously stated the electrodes 7 and 8 form part, is connected between the shafts 7a and 8a to produce a weld current indicated by the dotted lines 11.

In operation, the electrodes 7 and 8 are intermittently rotated in the directions respectively indicated by the arrows 'A' and 'B', and the metal pieces 9 and 10 are moved in steps in the direction indicated by the arrow 'C' in synchronism with the rotation of the electrodes. The welding current is generated between the electrodes after each set of movements thereby resulting in the production of a succession of overlapping spot welds 12 along a seam.

In the spot or seam welding of zinc and/or tin coated metal pieces with electrodes of copper or a copper-base alloy, vaporization of the coating material can, as previously stated, due to the alloying effect with the copper or copper-base electrode, result in an increased erosion rate and a deterioration of the electrode profile.

It is, therefore, necessary to redress the welding faces of the electrodes to the correct profile in order to maintain the contact area and thereby the contact resistance between the electrodes and the work pieces at the desired value. Changes in the contact area of an electrode for example will have a great influence on current density during welding, in addition to affecting electrode force settings.

After each redressing operation it is necessary with the coated metal pieces to precondition the electrodes prior to the commencement of a normal production run in order to obtain consistent welding results during the production run. Preconditioning involves making 30 to 50 welds in order to coat the newly profiled welding faces with the vaporized coating. During this preconditioning period the characteristics of the electrodes for example their electrical conductivity, change very rapidly due to the alloying effect, resulting in very inconsistent welds. For example, it is known that in the welding thickness range 0.025 to 0.031 inches the preconditioning of electrodes will at first cause some welds to fuse slightly while other welds will adhere to the electrodes without forming a weld nugget. Progressively the electrical conductivity of the electrodes will stabilize and parts of nuggets will be formed until about the 50th weld is made. At this point, the electrode characteristics become more uniform and thereby more consistent spot welds are obtained. With welding thicknesses of 0.036 inches or greater the weld current level will be highest as the preconditioning run starts and thus abnormally high strength welds, or more likely, expulsion, will occur during the first 30 welds. Normally weld current will then decrease to a desired level and allow more uniform and consistent welds to be obtained.

It can, therefore, be seen that the preconditioning of the electrodes results in a softening of the welding faces as well as stabilizing the electrical conductivity of the electrodes. The softening of the welding faces of the electrodes, as was previously outlined, continues as the electrodes are used resulting in loss of welding face profile and thereby weld quality.

With the copper or copper-base electrodes according to the present invention, the profiled welding faces of the electrodes are coated with an electroless nickel/phosphorus alloy which is almost completely impervious to the vaporized coating material. This alloy coating, therefore, protects to a large degree the welding faces against the alloying effect of the vaporized coating material. However, since the nickel/phosphorus alloy coating is not completely impervious to the vaporized coating material, the alloying effect will occur but at a considerably reduced rate, and the alloying which does occur does not affect the characteristics of the electrodes until a relatively large number of welds have been made.

Consequently, it is not necessary to subject the electrodes according to the invention to the preconditioning process outlined in a preceding paragraph, and when compared with uncoated electrodes, the coated electrodes give improved weld quality and better consistency of weld. It is found in practice that the weld quality obtained when using uncoated electrodes deteriorates in an uncontrollable manner.

The electroless nickel/phosphorus alloy coating also gives the electrodes a longer life than the uncoated electrodes. It has been found in practice that the number of acceptable welds that can be effected with the coated electrode before redressing and recoating is required, is more than five times greater than the number of acceptable welds that can be effected with uncoated electrodes. It can, therefore, be seen that this will result in a reduction in the electrode costs and a reduction of the time lost due to redressing of the electrode and the subsequent setting-up operation.

The coated electrodes are produced from copper or a copper-base alloy, for example beryllium-copper by machining to the desired shape and welding face profile for a particular application, prior to coating the welding faces with the electroless nickel/phosphorus alloy. The coating thickness is preferably in the range 0.0001 inches to 0.010 inches, the actual thickness utilized being dependent on the particular application and the welding parameters.

In a typical electroless nickel/phosphorus alloy coating process for beryllium-copper electrodes, the coating is deposited onto the welding faces from a solution of nickel chloride, sodium citrate, sodium hypophosphite and water in the ratios of 3: 10 : 3: 100. The solution is controlled, during the deposition process, to a temperature of the order of 95° C and a pH value of between 8 and 9; the pH value is maintained between these values by adding caustic soda to the deposition solution. During the life of the deposition solution, 4 to 5 grams of sodium hypophosphite should be added to the solution at 1 hour intervals in order to obtain the correct solution balance.

It is to be understood that the foregoing description of specific examples of this invention is made by way of example only and is not to be considered as a limitation in its scope.

What is claimed is:

1. A welding electrode for the electrical resistance welding of zinc and/or tin coated metal including a body member of copper or a copper-base alloy having an electroless nickel/phosphorus alloy coating on a welding face or faces thereof, said welding face or faces being profiled.

2. A welding electrode as claimed in claim 1 wherein the body member is of beryllium-copper.

3. A welding electrode as claimed in claim 1 wherein the thickness of the said coating is in the range 0.0001 inches to 0.010 inches.

* * * * *